(12) United States Patent
Igata et al.

(10) Patent No.: US 11,386,790 B2
(45) Date of Patent: Jul. 12, 2022

(54) VEHICLE OPERATION MANAGEMENT SYSTEM AND VEHICLE OPERATION MANAGEMENT METHOD

(71) Applicant: Toyota Jidosha Kabushiki Kaisha, Toyota (JP)

(72) Inventors: Hiroshi Igata, Yokohama (JP); Yuchi Yamanouchi, Toyota (JP); Atsushi Sajiki, Okazaki (JP); Hidenari Soya, Toyota (JP); Satoshi Usui, Machida (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 21 days.

(21) Appl. No.: 16/233,265

(22) Filed: Dec. 27, 2018

(65) Prior Publication Data

US 2019/0206257 A1 Jul. 4, 2019

(30) Foreign Application Priority Data

Dec. 28, 2017 (JP) .............................. JP2017-254825

(51) Int. Cl.
*G08G 1/0968* (2006.01)
*G08G 1/00* (2006.01)
(Continued)

(52) U.S. Cl.
CPC ......... *G08G 1/202* (2013.01); *G01C 21/3438* (2013.01); *G05D 1/0088* (2013.01);
(Continued)

(58) Field of Classification Search
CPC .............. G01C 21/3438; G01C 21/343; G01C 21/3453; G05D 1/0088; G05D 2201/0213; G06Q 10/02; G06Q 50/30; G08G 1/202

See application file for complete search history.

(56) References Cited

U.S. PATENT DOCUMENTS

| | | | |
|---|---|---|---|
| 2015/0227140 A1* | 8/2015 | Douglas ............... | G05D 1/0217 701/23 |
| 2016/0117929 A1* | 4/2016 | Chan ..................... | G06Q 30/04 701/3 |

(Continued)

FOREIGN PATENT DOCUMENTS

| | | |
|---|---|---|
| CN | 102119320 A | 7/2011 |
| CN | 102538809 A | 7/2012 |

(Continued)

*Primary Examiner* — Hunter B Lonsberry
*Assistant Examiner* — Matthew J. Reda
(74) *Attorney, Agent, or Firm* — Dinsmore & Shohl LLP

(57) ABSTRACT

Provided is a vehicle operation management system having a server device and one or more vehicles. The vehicle includes equipment configured to provide a predetermined service inside the vehicle and a running control unit configured to control autonomous running of the vehicle. The server device includes a service request information acquisition unit. At least one of the server device and the vehicle includes a position information acquisition unit configured to acquire position information on the autonomous vehicle and a running route setting unit configured to set a running route of the vehicle. The running control unit controls running of the vehicle such that the vehicle runs along the running route set by the running route setting unit.

10 Claims, 9 Drawing Sheets

(51) Int. Cl.
  *G06Q 10/02*   (2012.01)
  *G01C 21/34*   (2006.01)
  *G05D 1/00*    (2006.01)
  *G06Q 50/30*   (2012.01)

(52) U.S. Cl.
  CPC ............ *G06Q 10/02* (2013.01); *G06Q 50/30* (2013.01); *G05D 2201/0213* (2013.01)

(56) References Cited

U.S. PATENT DOCUMENTS

| | | | |
|---|---|---|---|
| 2016/0148267 A1* | 5/2016 | Pittman | H04W 4/029 |
| | | | 705/14.53 |
| 2017/0068245 A1* | 3/2017 | Scofield | G08G 1/096838 |
| 2018/0188731 A1* | 7/2018 | Matthiesen | G06Q 10/02 |
| 2018/0211218 A1* | 7/2018 | Berdinis | G05D 1/0291 |
| 2018/0335777 A1* | 11/2018 | Gibbs | G05D 1/0297 |
| 2018/0350024 A1* | 12/2018 | Kaufman | G06Q 10/0833 |
| 2019/0103028 A1 | 4/2019 | Kobayashi et al. | |
| 2019/0137290 A1* | 5/2019 | Levy | G05D 1/0214 |

FOREIGN PATENT DOCUMENTS

| | | |
|---|---|---|
| CN | 103927789 A | 7/2014 |
| CN | 105976038 A | 9/2016 |
| CN | 106447087 A | 2/2017 |
| JP | 2000-230838 | 8/2000 |
| JP | 2003-216812 A | 7/2003 |
| JP | 2006040191 A | 2/2006 |
| JP | 2017182137 A | 10/2017 |
| WO | 2010024449 A1 | 3/2010 |

\* cited by examiner

VEHICLE OPERATION MANAGEMENT SYSTEM AND VEHICLE OPERATION MANAGEMENT METHOD

CROSS-REFERENCE TO RELATED APPLICATIONS

This application claims priority to Japanese Patent Application No. 2017-254825 filed on Dec. 28, 2017, which is incorporated herein by reference in its entirety including the specification drawings and abstract.

BACKGROUND

1. Technical Field

The present disclosure relates to a vehicle operation management system and a vehicle operation management method that are used to provide various services using an autonomous vehicle.

2. Description of Related Art

It has hitherto become possible liar consumers of services in various categories of business, including private tutoring, home-visit nursing and caring, and on-site used goods purchasing service, to enjoy services at home without having to visit the business places of service providers. The same is true of administrative services. Efforts are being made such as establishing branch offices for consultation, and dispatching consultants to the houses of consumers. A system disclosed in Japanese Patent Application Publication No. 2003-216812 enables pension subscribers to go through procedures, have consultations, etc. regarding their pensions at home without having to visit a social insurance office.

Such a framework that allows people to enjoy services without taking the trouble of visiting the places where the services are provided is expected to have a growing demand in modern society where aging of the population and rural depopulation are progressing and the way of working and the rhythm of living of citizens are diversifying.

On the other hand, there are a considerable number of consumers who wish to but cannot receive a service for reasons including that they feel uncomfortable about being visited by service staff (worry about what their neighbors might think, do not want their families to know, do not want to invite a stranger into their houses, etc.), and that their houses do not have appropriate space or equipment for receiving a service.

One possible solution is to dispatch a vehicle having a space and equipment for providing a service and provide the service inside the vehicle, for example, like a mobile library. However, implementing this method requires a space to park the vehicle while the service is provided. Unless such a space is available near a location where a consumer desires to receive a service, the service cannot be provided by this method. In the first place, parking such a vehicle for a long time is in some cases unacceptable in light of laws and regulations, public manners, consumer needs, etc.

SUMMARY

The present disclosure provides a system and a vehicle operation management method that can provide various services to consumers inside a vehicle and that do not require parking the vehicle for a long time.

A first aspect according, to the present disclosure relates to a vehicle operation management system having a server device and one or more vehicles. The vehicle includes equipment configured to provide a predetermined service inside the vehicle and a running control unit configured to control autonomous running of the vehicle. The server device includes a service request information acquisition unit configured to acquire service request information including start time specifying information for specifying the time to start providing the service, end time specifying information for specifying the time to end the service, information on a pick-up point at which the vehicle picks up a user scheduled to receive the service, and information on a drop-off point at which the vehicle drops off the user. At least one of the server device and the vehicle includes a position information acquisition unit configured to acquire position information on the vehicle, and a running route setting unit configured to set a running route of the vehicle, by using the service request information acquired by the service request information acquisition unit and the position information on the vehicle acquired by the position information acquisition unit, such that the vehicle arrives at the pick-up point in keeping with the time to start providing the service and arrives at the drop-off point in keeping with the time to end the service. The running control unit controls running of the vehicle such that the vehicle runs along the running route set by the running route setting unit.

Examples of the service provided inside the vehicle include a wide variety of services. The service may be a service provided by on-board staff, examples of which are consultation services such as various kinds of consultations and help with procedures; hairdressing and beauty care services such as haircut, nail art, and beauty treatment; and educational services such as private tutoring and cultural classes. Alternatively, only a space and equipment may be provided. For example, the service may be a service of providing a relaxation space equipped with aromatherapy goods, massage equipment, bedding, a bar counter, etc.; a karaoke room or a theater room equipped with AV equipment (an image display device, audio equipment, a content reproduction device, etc.); or a reading space provided with books.

Examples of the equipment installed in the vehicle include various pieces of equipment according to the service. Other than those pieces of equipment mentioned above, the vehicle may include furniture such as a desk, chair, and sofa; kitchen appliances such as a refrigerator and microwave; goods for hoard games such as go, Japanese chess, and mah-jongg; or various other toys. The equipment here is not limited to equipment installed inside the vehicle, and a space of a vehicle body that is partially (or entirely) formed by a so-called one-way mirror may be provided as equipment. It is conceivable to provide a cruising, service for enjoying scenery by using such a vehicle.

Here, the vehicle may include the whole of the position information acquisition unit and the running route setting unit, or the server device may include some of the position information acquisition unit and the running route setting unit. Alternatively, the functions of the position information acquisition unit and the running route setting unit may be distributed between the vehicle and the server device. A plurality of the vehicles may cooperate with one another to compose the position information acquisition unit and the running route setting unit.

For example, the service request information acquisition unit may be composed of a storage device and an interface that receives an input from a user. An input terminal may be provided in the vehicle, or an input from a terminal on the user side may be received through a communication line. The input is not necessarily an input from a user, and an input may be received from a business operator side, or information may be acquired by reading data held in the storage device.

The position information acquisition unit acquires information for specifying the position of the vehicle, and for example, may be various on-hoard sensors installed in the vehicle, such as a GPS receiver and an on-board camera, or may be a signal transmitter installed, in the vehicle and a signal receiver installed at an arbitrary location.

The vehicle operation management system having this configuration can provide an arbitrary service to a user inside a vehicle (i.e., a space where privacy is secured) while causing the vehicle to run autonomously until the time to end the service.

The end time specifying information may include information on service contents. The running route setting unit may obtain a time taken to provide the service based on the information on the service contents, and then calculate the end time from the time to start providing the service and the time taken to provide the service. Here, the running route setting unit may obtain a service duration time based on a table that holds service contents and a standard service duration time in association with each other, or may obtain the servicing duration time based on service content information that is a set of a type of service and a duration time of the service. This configuration can eliminate the trouble of inputting time to end the service, which is convenient for a user.

When the pick-up point and the drop-off point are the same point, the running route setting unit may set a route along which the vehicle runs to a place a predetermined distance away from the pick-up point and then, returns to the pick-up point. In the case where the pick-up point and the drop-off point are the same point, if such a running route is set that the vehicle stands by in the neighborhood of the point or cruises in the neighborhood, the vehicle may cause inconvenience to the neighborhood of the point or attract the attention of residents of the neighborhood, which is a situation some users do not desire. Setting a route along which the vehicle runs to a place a predetermined distance away and then returns as described above can avoid such a situation.

In the vehicle operation management system at least one of the server device and the vehicle may further have a traffic information acquisition unit configured to acquire information on traffic around the vehicle. The running route setting unit may set the running route with priority given to a less congested route over a more congested route based on the information on traffic. This configuration can prevent a situation where the vehicle gets stuck in congestion and fails to arrive at the drop-off point by the end time.

In the vehicle operation management system, at least one of the server device and the vehicle may have a road information acquisition unit configured to acquire information on roads around the vehicle. The running route setting unit may set the running route with priority given to a route passing through a road that is less straining to run on over a route passing through a road that is more straining to run on based on the information on roads. Here, the road information includes information on a road environment such as the road gradient, degree of unevenness, the number of curves, degree of curvature, and a road width. A road that is less straining to run on means a road that is flat (i.e., has a small gradient and a small degree of unevenness) and straight (i.e., has a gentle curve or a small number of curves). Preferentially running on such a road can reduce the discomfort felt by occupants on board the vehicle as well as the strain put on the vehicle.

The running route setting unit may set the running route with priority given to a route on which the vehicle stands by for a predetermined tune in a parking lot located around a current location or located on a route found by a search. This configuration can save the energy to drive the vehicle and also reduce the likelihood of the vehicle getting involved in an accident while running.

The running route setting Lunt may modify the running route based on the position information on the vehicle and at least one of the time to start providing the service and the time to end the service. This configuration allows the vehicle, to arrive at the drop-off point in keeping with scheduled end time even when expected arrival time deviates from initially expected dine due to the actual road situation.

The service request information acquisition unit may accept a change in the end time specifying information, and the running route setting unit may modify the running route based on the contents of the accepted change. This configuration can respond to a need such as ending a service (getting to a drop-off point) earlier than initially scheduled, or putting off the time to provide a service, at a user's wish or due to the actual status of the service being provided.

The service request information acquisition unit may acquire pieces of service request information from a plurality of users. The running route setting unit may combine the pieces of service request information from the users, and set the running route with priority given to a route that allows one vehicle to provide a service to a plurality of users at the same time.

Some types of service, for example, providing a reading space or a learning space, can be provided to different users at the same time by dividing a space inside the vehicle. The above configuration makes it possible to efficiently operate the vehicle in such a case by setting a route that passes through pick-up points and drop-off points of a plurality of users who desire to receive a service.

The service request information may include information on a contact address of a user, and at least one of the server device and the vehicle may have a user guidance unit configured to transmit information for guiding the user to the vehicle to the contact address of the user, in keeping with arrival of the vehicle at the pick-up point. This configuration can eliminate the need for a user to wait for the vehicle to arrive at the pick-up point, and can prevent a user from being mistakenly picked up by another vehicle.

The vehicle may have a user pick-up and drop-off detection unit configured to detect the vehicle's picking up and dropping off the user. When the vehicle has arrived at the pick-up point, the running control unit may allow the vehicle to start moving after the vehicle's picking up the user is detected and after a predetermined time has elapsed. Even when the vehicle cannot pick up a user by the time to start providing the service, this configuration can prevent the vehicle from departing leaving the user behind. The vehicle departs after a predetermined time has elapsed even when picking up of a user is not detected, so that the vehicle is prevented from standing by indefinitely.

A second aspect according to the present disclosure relates to a method of managing operation of one or more vehicles capable of autonomous running. The method includes: acquiring position information on the vehicle; acquiring service request information including start time specifying information for specifying the time to start providing a service, end time specifying information for specifying the time to end the service, information on a pick-up point at which the vehicle picks up a user of the service, and information on a drop-off point at which the vehicle drops off the user, the start time specifying information, the end time specifying information, the information on the pick-up point, and the information on the drop-off point being pieces of information that are used to provide a predetermined service to the user by using the vehicle; receiving an application for receiving the service based on the service request information; setting a running route of the vehicle based on a position of the vehicle and the service request information such that the vehicle arrives at the pick-up point in keeping with the time to start providing the service and arrives at the drop-off point in keeping with the time to end the service; and causing the vehicle to run along the running route.

The present disclosure can be defined as a vehicle operation management system or a server device including at least some of the above-described units. Moreover, the present disclosure can be defined as a method performed by the vehicle operation management system or the server device. The above-described processes and structure can be implemented in arbitrary combinations as long as no technical contradiction arises.

The present disclosure can provide a system that can provide various services to consumers inside a vehicle and that does not require parking the vehicle for a long time.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

First Embodiment

System Overview

Figure 1:
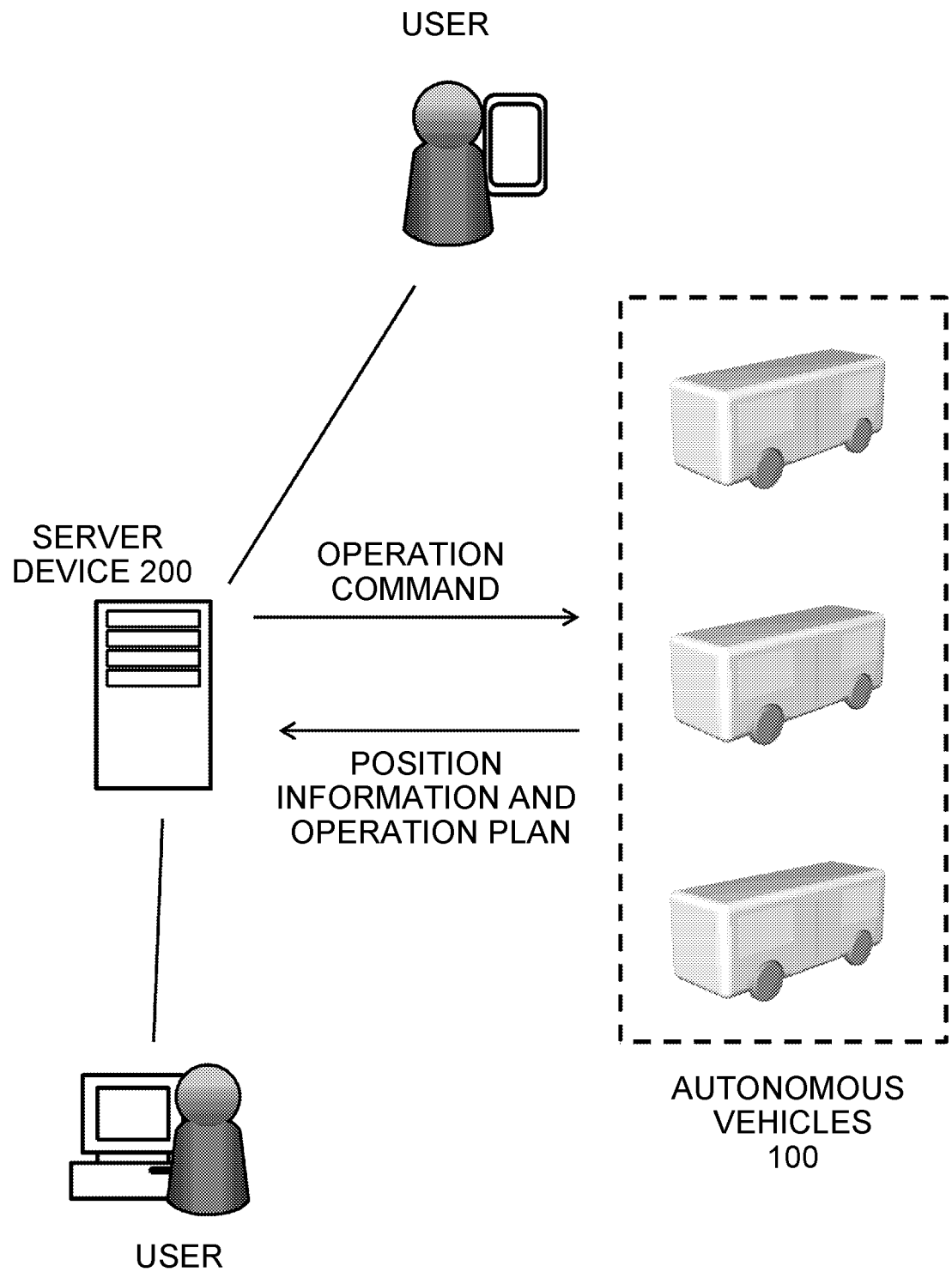
FIG. 1 is a schematic system diagram of a vehicle operation management system according to a first embodiment.

An overview of a vehicle operation management system according to a first embodiment will be described with reference to FIG. 1. The vehicle operation management system according to this embodiment includes a plurality of autonomous vehicles 100 that runs autonomously based on a given command, and a server device 200 that issues this command. The autonomous vehicles 100 are self-driving vehicles that provide predetermined services, and the server device 200 is a device that manages the autonomous vehicles 100.

The autonomous vehicles 100 are vehicles that run autonomously on roads, and can each have equipment for providing a different service. For example, a vehicle that provides a consultation service, such as various kinds of consultations and, help with procedures, can be equipped with a set of reception-room furniture or office furniture etc., and a vehicle that provides a relaxation, service can be equipped with massage chairs, aromatherapy goods, bedding, etc. The equipment here is not limited to equipment that is installed inside the vehicle, and a space of a vehicle body that is partially (or entirely) formed by a so-called one-way mirror may be provided as equipment. Such a vehicle can provide a cruising service for enjoying scenery.

In some embodiments, the autonomous vehicle 100 is not an unmanned vehicle. For example, service staff, security personnel, etc. may also be on board. In some embodiments, the autonomous vehicle 100 is not a vehicle capable of running fully autonomously. For example, the autonomous vehicle 100 may be a vehicle that a person drives or assists in driving according to the situation.

The server device 200 is a device that commands the autonomous vehicle 100 to operate. For example, the server device 200 receives an application for a service from a user, and acquires information on the time to start providing the service, a pick-up point, the time to end the service, and a drop-off point, and then transmits an operation command to an autonomous vehicle 100 that is running in the vicinity (and that can provide the service desired by the user). Thus, the server device 200 can cause the autonomous vehicle 100 to run from a departure point to an arrival point while providing a predetermined service.

System Configuration

Figure 2:
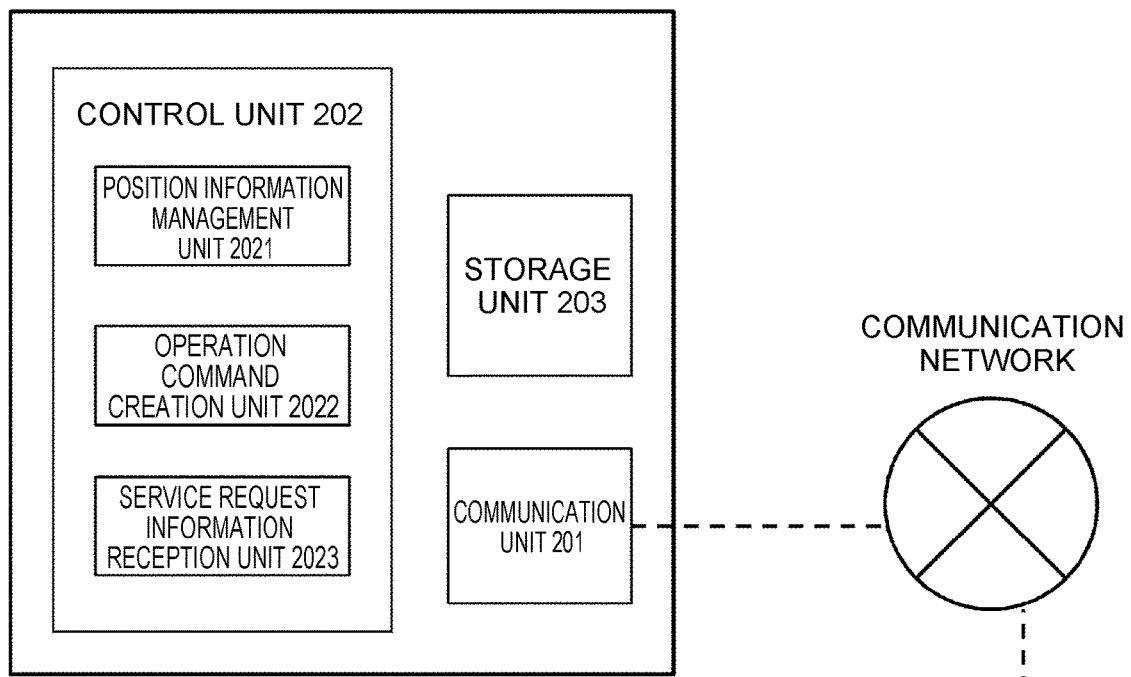
FIG. 2 is a block diagram schematically showing an example of components of the vehicle operation management system.
Figure 2:
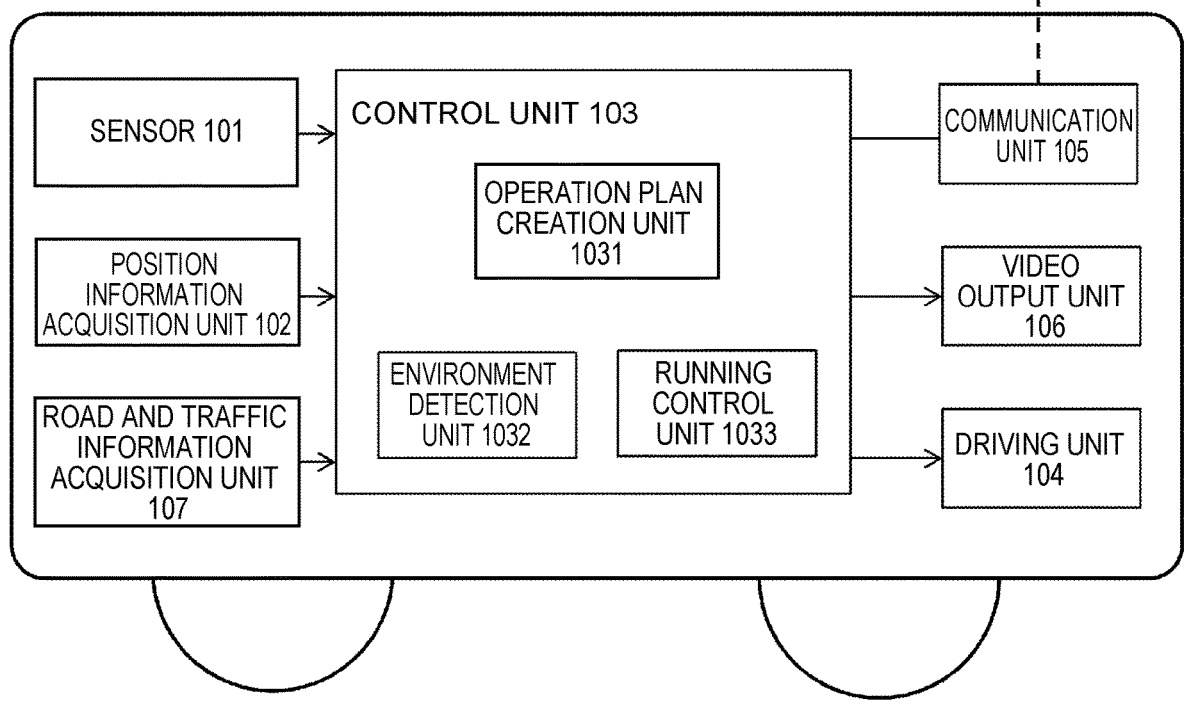

Components of the system will be described in detail. FIG. 2 is a block diagram schematically showing an example of the configurations of the autonomous vehicle 100 and the server device 200 shown in FIG. 1. A plurality of autonomous vehicles 100 may be provided.

The autonomous vehicle 100 is a vehicle that runs according to an operation command acquired from the server device 200. Specifically, the autonomous vehicle 100 creates a running route based on an operation command acquired through wireless communication, and runs on a road in an appropriate manner while sensing the surroundings of the vehicle.

The autonomous vehicle 100 includes a sensor 101, a position information acquisition unit 102, a control unit 103, a driving unit 104, a communication unit 105, a video output unit 106, and a road and traffic information acquisition unit 107. The autonomous vehicle 100 operates on electric power supplied from a battery (not shown).

The sensor 101 senses the surroundings of the vehicle, and typically includes a stereo camera, a laser scanner, an LIDAR, a radar, etc. Information acquired by the sensor 101 is transmitted to the control unit 103. The position information acquisition unit 102 acquires the current position of the vehicle, and typically includes a GPS receiver, etc. Information acquired by the position information acquisition unit 102 is transmitted to the control unit 103.

The control unit 103 is a computer that controls the autonomous vehicle 100 based on the information acquired from the sensor 101. For example, the control unit 103 is formed by a microcomputer.

The control unit 103 has an operation plan creation unit 1031, an environment detection unit 1032, and a running control unit 1033 as functional modules. These functional modules may be realized by executing a program stored in storage units, such as a read only memory (ROM), by a central processing unit (CPU) (neither is shown).

The operation plan creation unit 1031 acquires an operation command from the server device 200 and creates an operation plan of the vehicle. In this embodiment, an operation plan is data specifying a route for the autonomous vehicle 100 to run along, and a process to be performed by the autonomous vehicle 100 along a part or the whole of the route. The following are examples of the data included in the operation plan.

(1) Data representing the route for the vehicle to run along as a collection of road links. For example, the route for the vehicle to run along may be automatically created based on given places of departure and destination with reference to stored map data, information acquired by the road and traffic information acquisition unit 107 to be described later, etc. Alternatively, an external service may be used. The route for the vehicle to run along may be provided from the server device. In other words, the route may be included in the operation command.

(2) Data representing the process to be performed by the vehicle at points on the route. Examples of the process to be performed by the vehicle include, but are not limited to, picking up and dropping off a person, collecting data, and announcing a service provided by the vehicle (by using an external display to be described later). The operation plan created by the operation plan creation unit 1031 is transmitted to the running control unit 1033 to be described later.

The environment detection unit 1032 detects the environment around the vehicle based on the data acquired by the sensor 101. Examples of detection targets include, but are not limited to, the number and positions of lanes, the number and positions of vehicles present around the vehicle, the number and positions of obstacles (e.g., pedestrians, bicycles, structures, and buildings) present around the vehicle, the structure of the road, and road signs. Detection targets may be any objects that are required to detect for autonomous running. The environment detection unit 1032 may track a detected object. For example, the environment detection unit 1032 may obtain a relative speed of an object from a difference between coordinates of the object detected one step earlier and the current coordinates of the object. Data related to the environment (hereinafter referred to as environmental data) detected by the environment detection unit 1032 is transmitted to the running control unit 1033 to be described below.

The running control unit 1033 controls running of the vehicle based on the operation plan created by the operation plan creation unit 1031, the environmental data created by the environment detection unit 1032, and the position information on the vehicle acquired by the position information acquisition unit 102. For example, the running control unit 1033 causes the vehicle to run along a predetermined route in such a manner that no obstacle enters a predetermined safety region centered on the vehicle. A commonly known method can be adopted as the method of causing a vehicle to run autonomously.

The driving unit 104 causes the autonomous vehicle 100 to run based on a command created by the running control unit 1033. For example, the driving unit 104 includes a motor, inverter, brake, steering mechanism, etc. that drive wheels. The communication unit 105 connects the autonomous vehicle 100 to a network. In this embodiment, the communication unit 105 can communicate with other devices (e.g., the server device 200) via a network by using a mobile communication service, such as 3G or LTE. The communication unit 105 may further perform inter-vehicle communication with other autonomous vehicles 100.

Figure 3:
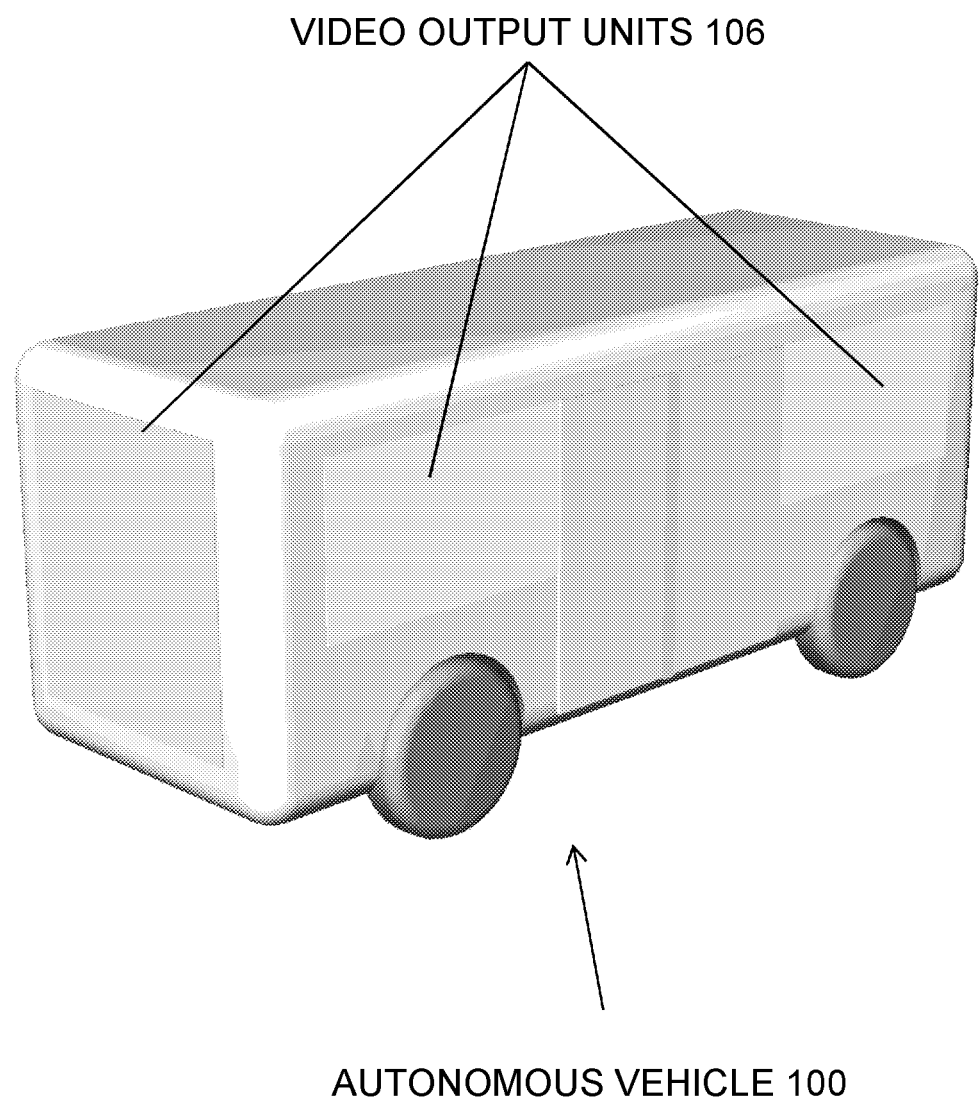
FIG. 3 is a view showing the external appearance of an autonomous vehicle 100.

The video output unit 106 outputs a video to the external display provided on a vehicle body. FIG. 3 is a view illustrating the external appearance of the autonomous vehicle 100. As shown, in this embodiment, the autonomous vehicle 100 has a plurality of displays on an outer side of the vehicle body and can output arbitrary videos. The external display may be a liquid crystal display or may be formed by an LED matrix, etc. The video output unit 106 can create or acquire a video based on data included in the operation plan and can output the video to the external display.

The road and traffic information acquisition unit 107 acquires road information and traffic information on roads and traffic in a surrounding area including the places of departure and destination, for example, through the communication unit 105. Here, the road information is information related to a road environment including the road gradient, degree of unevenness, the number of curves, degree of curvature, and a road width, and the traffic information is information including the amount of traffic on each road (whether there is any congestion), closure of roads, and whether any accident has occurred.

Next, the server device 200 will be described. The server device 200 is a device that manages running positions of the autonomous vehicles 100 and transmits an operation command. For example, upon receiving a request for receiving a service from a user, the server device 200 transmits an operation command to an autonomous vehicle 100 that is running in the vicinity of the pick-up point of the user and that has equipment for providing a requested service, based on the pick-up point and service start time.

The server device 200 includes a communication unit 201, a control unit 202 and a storage unit 203. The communication unit 201 is a communication interface similar to the communication unit 105, and is used to communicate with the autonomous vehicle 100 and/or a user terminal (not shown) via a network. The control unit 202 exercises control over the server device 200, For example, the control unit 202 is formed by a CPU.

The control unit 202 has a position information management unit 2021, an operation command creation unit 2022, and a service request information reception unit 2023 as functional modules. These functional modules may be realized by executing a program stored in storage units, such as an ROM, by a CPU (neither is shown).

The position information management unit 2021 collects pieces of position information from the autonomous vehicles 100 under the management thereof, and manages these pieces of position information. Specifically, the position information management unit 2021 receives pieces of position information from the autonomous vehicles 100 at predetermined intervals and stores these pieces of position information in association with time in the storage unit 203.

Upon receiving a request for receiving a service, the operation command creation unit 2022 determines an autonomous vehicle 100 to be dispatched and creates an operation command according to the request. A wide variety of services are provided as already mentioned, and examples include, but are not limited to, the following: (1) A service provided by on-board service staff, for example, a consultation service such as legal consultation, administrative consultation, life counseling, help with procedures, or fortune-telling; a hairdressing and beauty care service such as haircut, nail art, or beauty treatment; an educational service such as academic, artistic, or business skills education; or a body maintenance service such as fitness or yoga classes or osteopathic treatment. (2) A service of providing a space having equipment desired by a user, for example, providing a relaxation space equipped with aromatherapy goods, massage equipment, bedding, etc.; providing a theater room equipped with an image display device, audio equipment, a content reproduction device, etc.; providing a learning and reading space equipped with desks, chairs, books, etc.; or providing a party room equipped with karaoke equipment, game machines, etc. (3) A service of transporting freights and passengers according to specified pick-up point and drop-off point or cruise route. This service may provide merely transportation, or may be, for example, a cruising service in which passengers can enjoy scenery in a vehicle of which the vehicle body is formed by a one-way mirror.

The service request information reception unit 2023 receives a request (application) from a user who desires to receive a service, acquires information required to provide the service (hereinafter referred to as service request information), and stores this information in the storage unit 203. The service request information includes start time specifying information for specifying the time to start providing the service, end time specifying information for specifying the time to end the service, information on a pick-up point at which the user is picked up by the autonomous vehicle 100, and information on a drop-off point at which the user is dropped off by the autonomous vehicle 100, etc. The service start time specifying information and the service end time specifying information need not be acquired from the user as time information. For example, the service start time specifying information may be received as a request such as "time at which the service can be started in the shortest time from the current time." The service end time specifying information may be obtained based on "service contents."

For example, the service request information is acquired from a user through the Internet, etc. In some embodiments, the source of transmission of service request information is not a general user, and the source of transmission may instead be, for example, a business operator that operates the autonomous vehicle 100. The autonomous vehicle 100 serving as the destination of transmission of the operation command is determined according to the pieces of position information on the respective vehicles acquired by the position information management unit 2021, pieces of attribute information (what functions the vehicle has) on the respective vehicles held in advance by the server device 200, etc.

The storage unit 203 stores information, and is formed by a recording medium, such as an RAM, a magnetic disk, or a flash memory.

System Actions in Vehicle Operation

Figure 4:
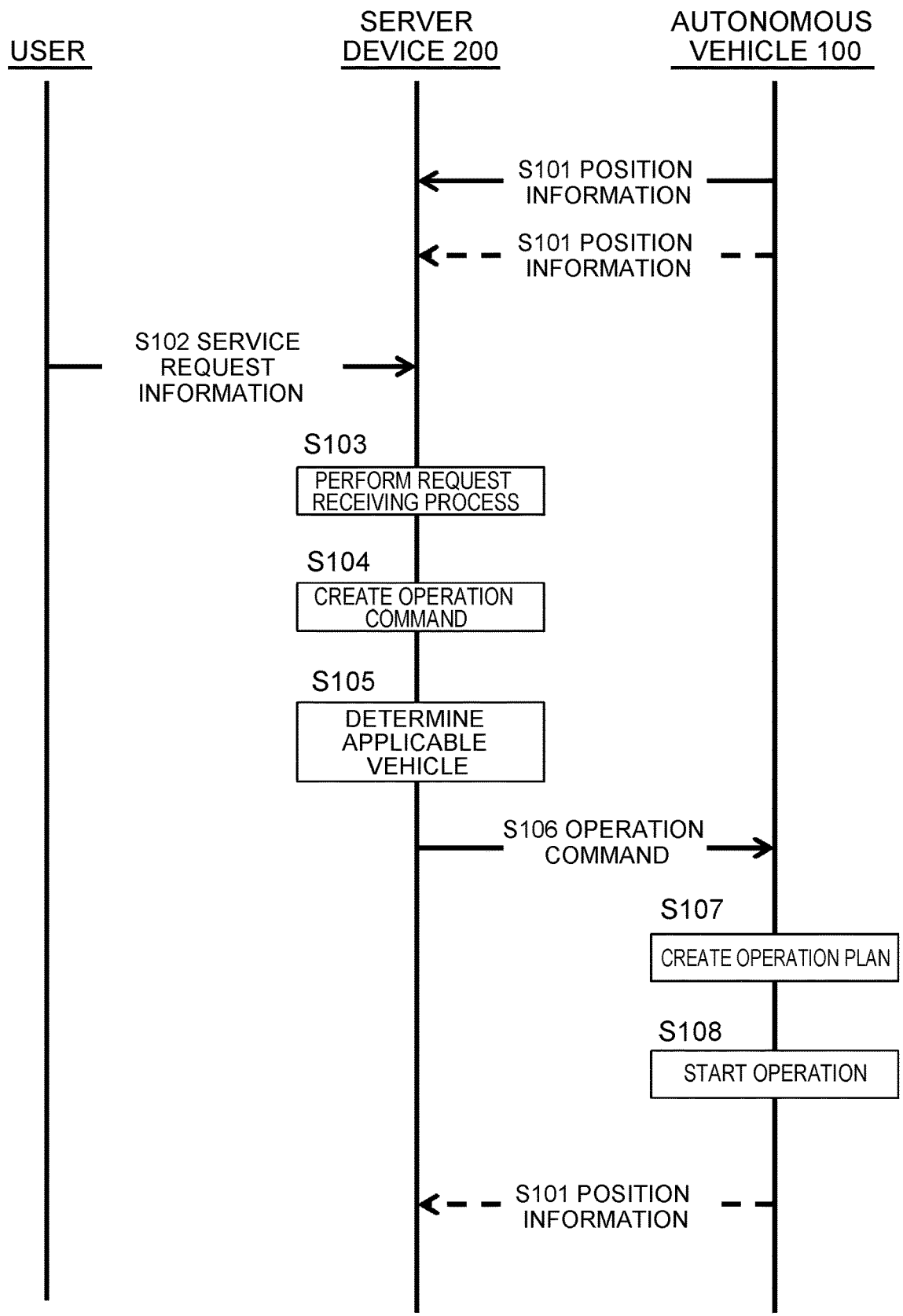
FIG. 4 is a diagram showing data transmitted and received among components of the system.
Figure 5:
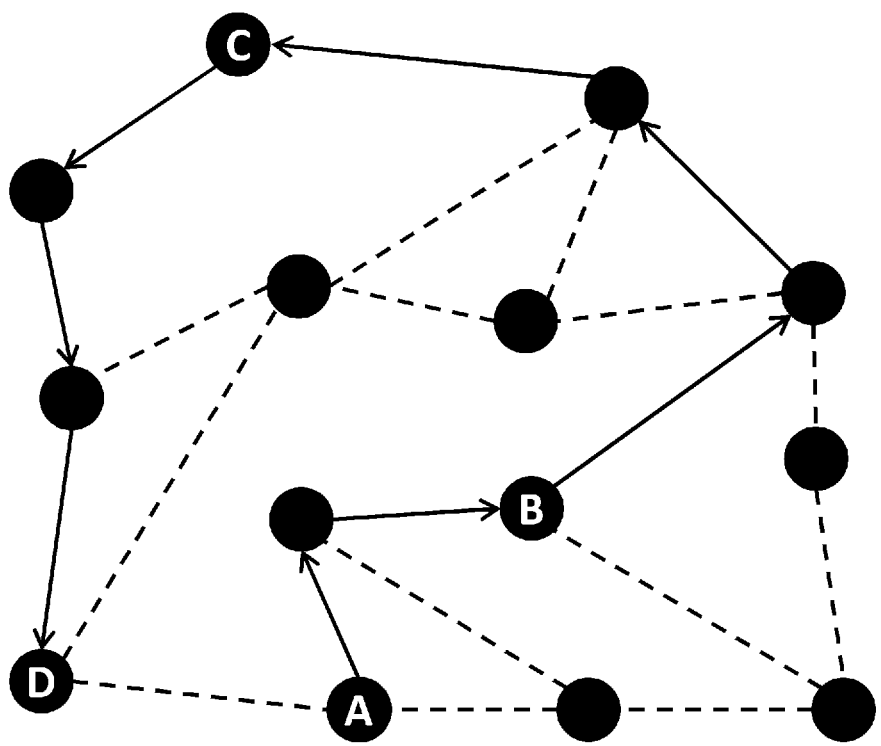
FIG. 5 is a view illustrating a road network according to the first embodiment.

Next, processes performed by the above-described components will be described. FIG. 4 is a view illustrating data flow in a process in which the server device 200 creates an operation command based on a service receiving request from a user and which ends with the autonomous vehicle 100 starting an operation. In the example to be described here, the autonomous vehicle 100 operates in the road network shown in FIG. 5.

The autonomous vehicle 100 periodically notifies the server device 200 of position information (step S101). For example, in the case of the example of FIG. 5, the autonomous vehicle 100 notifies the server device 200 that the autonomous vehicle 100 is located at node A, and the position information management unit 2021 stores the autonomous vehicle 100 and node A in association with each other in the storage unit 203. In some embodiments, the position information is not information on the position of a node itself. For example, the position information may be information for specifying a node or a link. A link may be divided into a plurality of sections. In some embodiments, the road network is not represented by nodes and links. The position information is updated each time the autonomous vehicle 100 has travelled.

When a user transmits service request information to the server device 200 through a communication device (not shown) (step S102), the server device 200 (service request information reception unit 2023) performs a process of receiving a request from the user (step S103). This process will be described in detail later. Upon completion of the request receiving process, the server device 200 (operation command creation unit 2022) creates an operation command according to the service request information (step S104).

The operation command may be a command specifying a user pick-up point, service start time, a user drop-off point, and service end time, or may be a command specifying a user pick-up point, service start time, a service duration time, and a user drop-off point. Alternatively, the operation command may be a command specifying a running route. The operation command may include information on the process to be performed on the route and the service to be provided. Here, it is assumed that an operation command ordering the autonomous vehicle 100 to pick up the user at node B and drop off the user at node C has been issued.

In step S105, the operation command creation unit 2022 selects an autonomous vehicle 100 that is to provide the service. For example, the operation command creation unit 2022 determines an autonomous vehicle 100 that can provide the requested service and that can be dispatched to the user pick-up point by the service start time, with reference to the stored pieces of position information on the autonomous vehicles 100. Here, it is assumed that the vehicle located at node A shown in FIG. 5 has been selected. Accordingly, an operation command is transmitted from the server device 200 to the applicable autonomous vehicle 100 (step S106).

In step S107, the autonomous vehicle 100 (operation plan creation unit 1031) creates an operation plan based on the received operation command. In the case of this example, for example, an operation plan is created according to which the autonomous vehicle 100 picks up the user at node B, drops of the user at node C, and returns to node D by running along the route indicated by the solid lines in FIG. 5. The created operation plan is transmitted to the running control unit 1033, and an operation is started (step S108). Also during the operation, position information is periodically transmitted to the server device 200.

Process of Receiving Service Receiving Request from User

Figure 6:
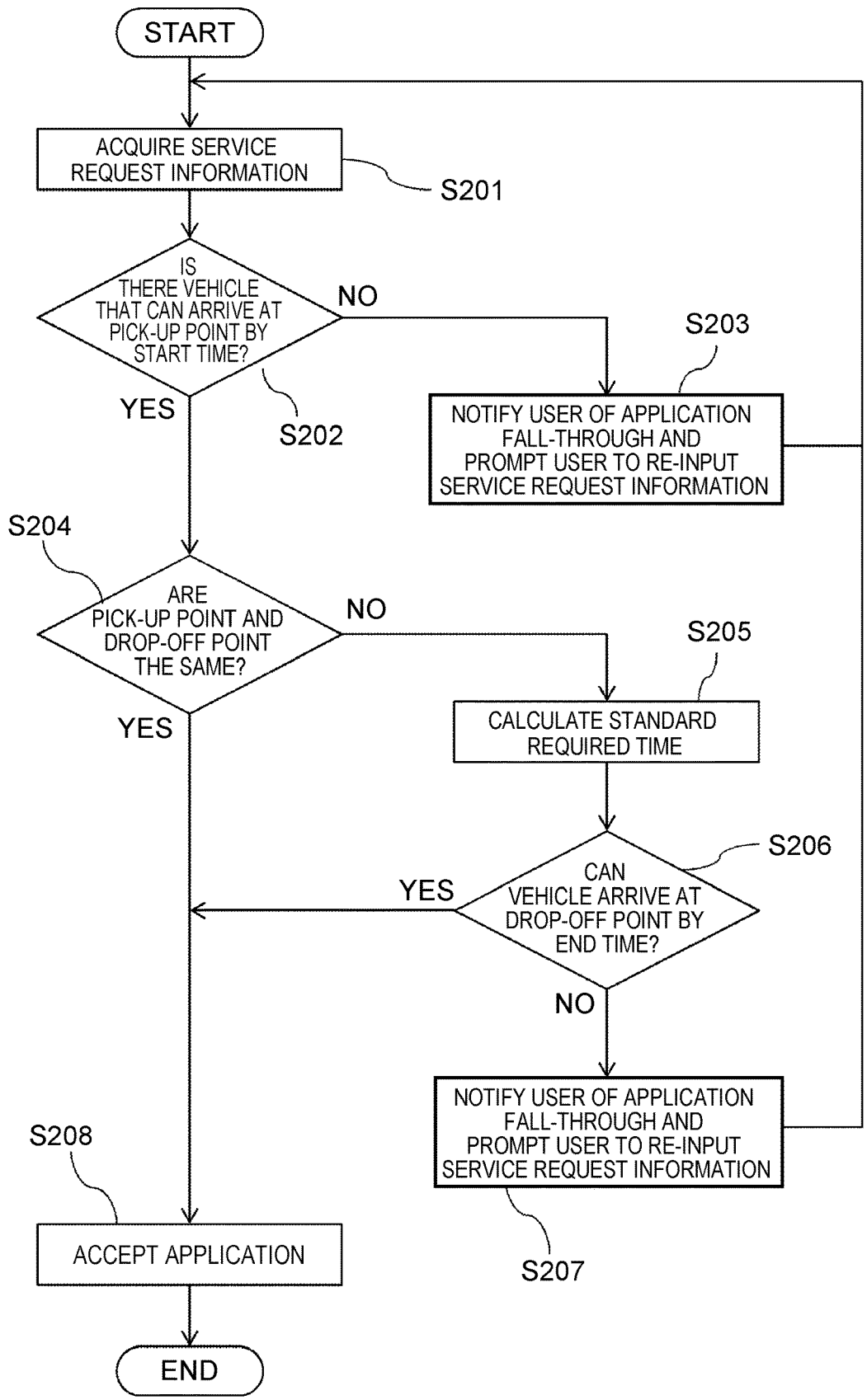
FIG. 6 is a flowchart showing an example of a process of receiving a request for receiving a service.

Next, an example of the process of receiving a user request in step S103 will be described. FIG. 6 is a flowchart showing an example of the sequence of the user request receiving process. First, the service request information reception unit 2023 acquires service request information from a user (step S201). Then, the service request information reception unit 2023 determines whether there is an autonomous vehicle 100 that can provide the requested service and that can be dispatched to the user pick-up point by the service start time, with reference to the stored pieces of position information on the autonomous vehicles 100 (step S202). Here, when there is no autonomous vehicle 100 that can be dispatched, the service request information reception unit 2023 notifies the user that the application has fallen through, and presents the user with the earliest time at which the service can be started, and then requests the user to re-input service request information (step S203).

On the other hand, when it is determined in step S202 that there is an autonomous vehicle 100 that can be dispatched, then the service request information reception unit 2023 determines whether the input user pick-up point and drop-off point are the same point (step S204). The same point here is not limited to exactly the same point bat also means approximate points that can be regarded as the same when travel by vehicle is taken into account. When it is determined in step S204 that the pick-up point and the drop-off point are the same point, the service request information reception unit 2023 notifies the user that the application has been accepted, and ends the receiving process (step S208).

When the pick-up point and the drop-off point are not the same in step S204, the service request information reception unit 2023 calculates a standard required time taken to reach the drop-off point from the pick-up point (step S205), and determines whether the drop-off point can be reached between the service start time and the service end time based on the standard required time (step S206).

When it is determined in step S206 that the drop-off point cannot be reached by the service end time, the service request information reception unit 2023 notifies the user that the application has fallen through, and presents the user with the standard required time taken to reach the drop-off point from the pick-up point, and then requests the user to re-input service request information (step S207). On the other hand, when it is determined in step S206 that the drop-off point can be reached by the service end time, the service request information reception unit 2023 notifies the user that the application has been accepted, and ends the receiving process (step S208).

Process of Setting Running Route

Figure 7A:
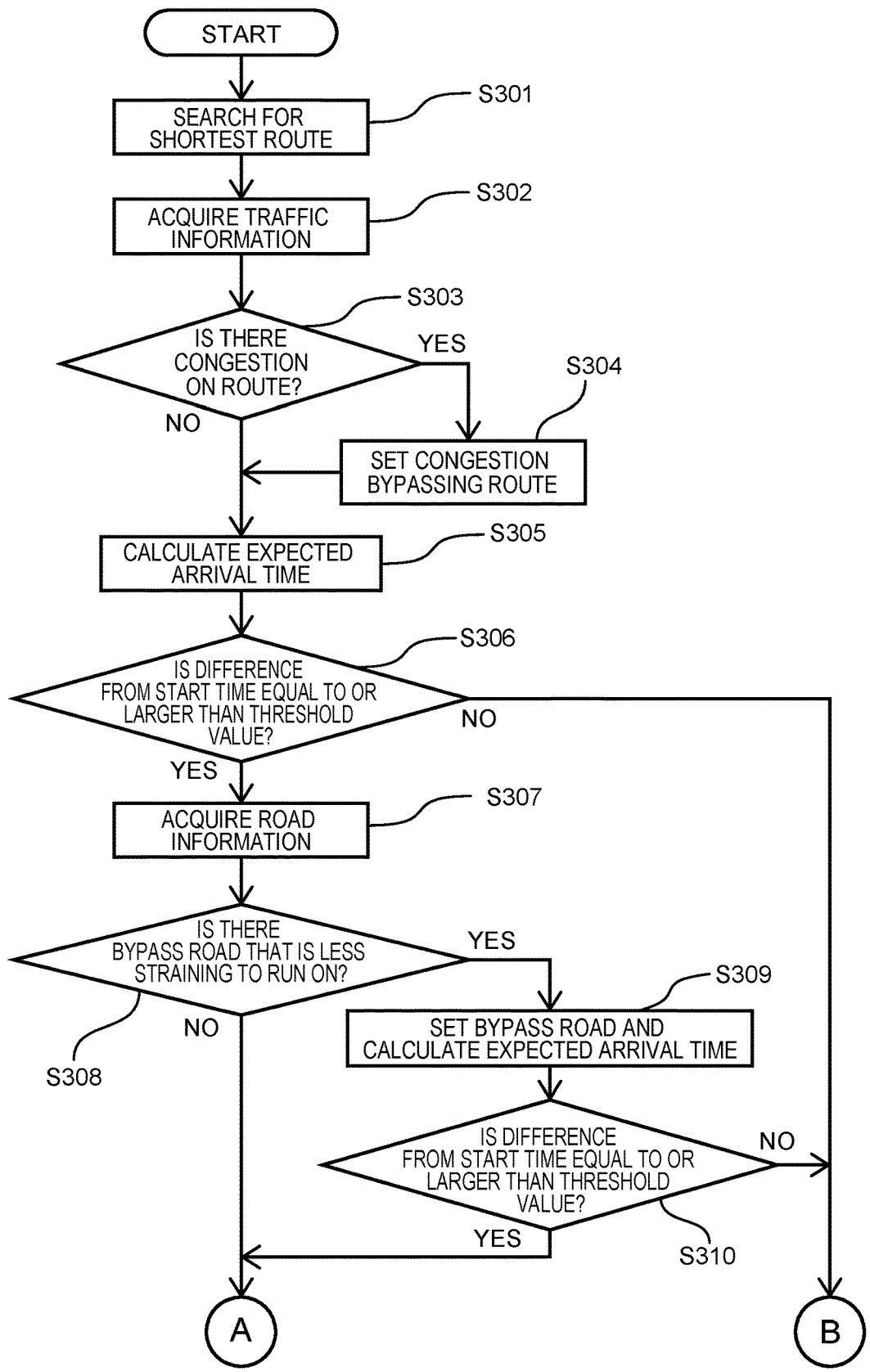
FIG. 7A is a flowchart showing an example of a process of setting a running route.
Figure 7B:
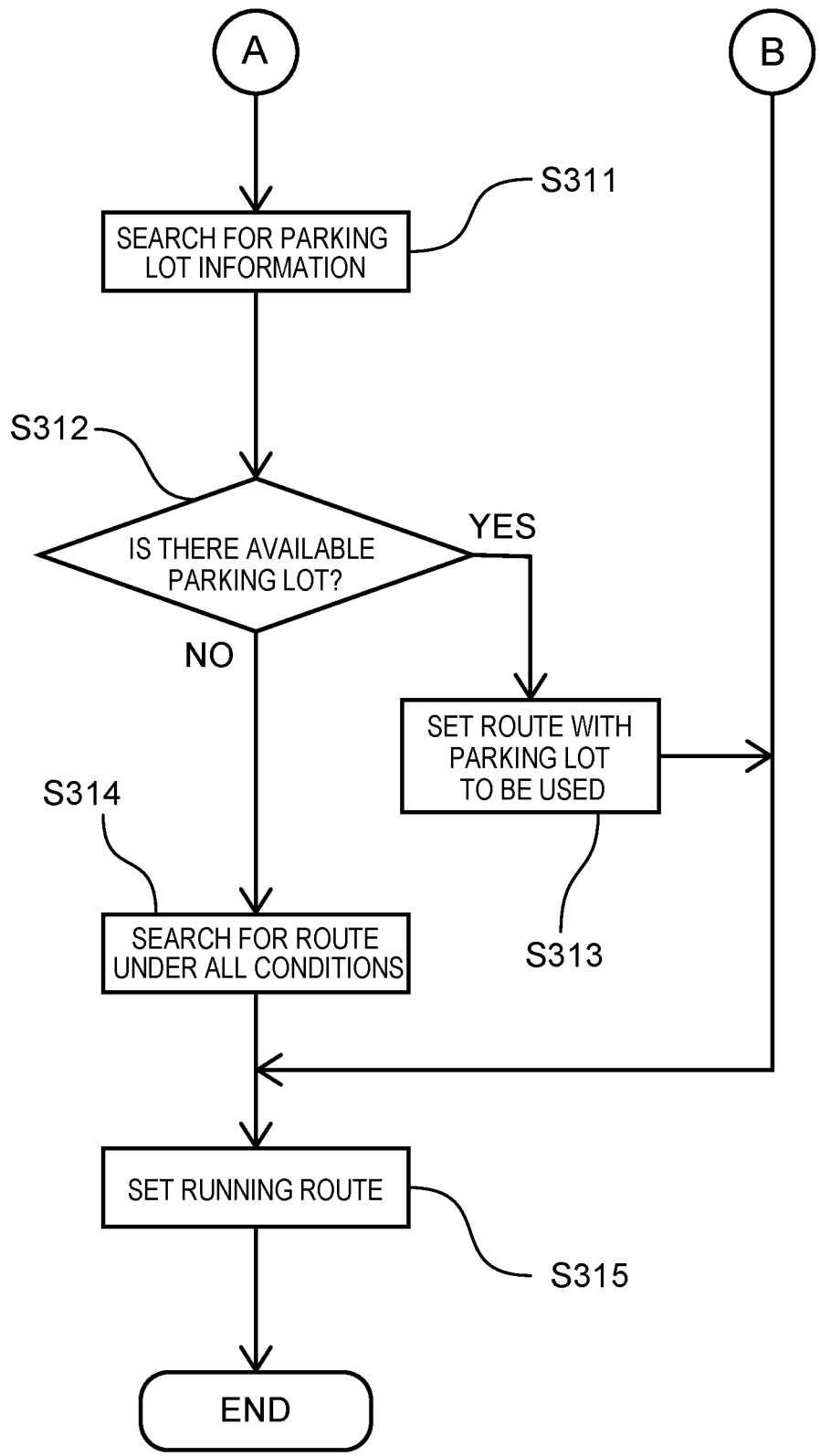
FIG. 7B is a flowchart showing an example of a process of setting a running route.

Next, an example of the process of setting the running, route in creating the operation plan in step S107 will be described. FIGS. 7A and 7B are flowcharts showing, an example of the sequence of the process of setting the running route from the location at which the operation command is received to the user pick-up point.

First, the operation plan creation unit 1031 searches for the shortest route to move from the current position of the vehicle to the user pick-up point (step S301). Then, the operation plan creation unit 1031 acquires traffic information (step S302), and determines whether there is congestion on the route found by the search in step S301 (step S303). Here, when there is no congestion, the operation plan creation unit 1031 moves to step S305. On the other hand, when there is congestion, the operation plan creation unit 1031 searches for a route that bypasses the congestion (congestion bypassing route) (step S304) and moves to step S305.

In step S305, the operation plan creation unit 1031 sets the route found by the search as a congestion avoiding route, and calculates expected arrival time in the case where the vehicle moves to the user pick-up point by this route, and then determines whether the time difference between the expected time and the service start time is equal to or larger than a predetermined threshold value (step S306). Here, when the time difference is smaller than the threshold value, the operation plan creation unit 1031 sets the route found by the search as the running route (step S315), and temporarily ends the current routine.

On the other hand, when the time difference between the expected arrival time and the service start time is equal to or larger than the threshold value in step S306, the operation plan creation unit 1031 searches for a route for time adjustment. First, the operation plan creation unit 1031 acquires road information in step S307, and determines whether there is a route that is less straining to run on than the shortest route based on the road information (step S308). Here, when there is no route that is less straining to run on than the shortest route, the operation plan creation unit 1031 moves to step S311.

On the other hand, when there is a route that is less straining to run on than the shortest route in step S308, the operation plan creation unit 1031 sets this route as a bypass route, calculates expected arrival time in the case where the vehicle moves to the user pick-up point by this route (step S309), and determines whether the time difference between the expected time and the service start time is equal to or larger than the predetermined threshold value (step S310), Here, when the time difference is smaller than the threshold value, the operation plan creation unit 1031 sets this route as the running route (step S315), and temporarily ends the current routine.

On the other hand, when the time difference between the expected arrival time and the service start time is equal to or larger than the threshold value in step S310, the operation plan creation unit 1031 moves to step S311. In step S311, the operation plan creation unit 1031 searches for a parking lot available to the vehicle around the current location or on the route found by the search, and moves to step S312. The search for a parking lot may be performed based on stored map data, or information may be acquired from outside through the communication unit 105, The parking lot here also means a place where the vehicle is standing by in the case where the vehicle is currently in a stand-by state.

In step S312, the operation plan creation unit 1031 determines whether there is an available parking lot. When there is an available parking lot, the operation plan creation unit 1031 obtains a route along which the vehicle stands by in the parking lot for a time that makes the time difference between the expected arrival time and the service start time smaller than the threshold value (step S313), and sets this route as the running route (step S315), and then temporarily ends the current routine.

On the other hand, when it is determined in step S312 that there is no available parking lot, the operation plan creation unit 1031 searches for a route that makes the time difference between the expected arrival time and the service start time smaller than the threshold value, from all possible routes including a route along which the vehicle runs a predetermined distance from the current position in a direction away from the user pick-up point and then returns (step S314). Then, the operation plan creation unit 1031 sets this route as the running route (step S315), and temporarily ends the current routine.

While the above process is the process of setting the running route from a location at which an operation command is received to a user pick-up point, the same process can be performed to set a route for running from a user pick-up point to a user drop-off point.

The vehicle operation management system as in this embodiment allows a user to receive a service desired by the user while travelling from one arbitrary point to another arbitrary point, and thus to effectively use the travel time.

Second Embodiment

Figure 8:
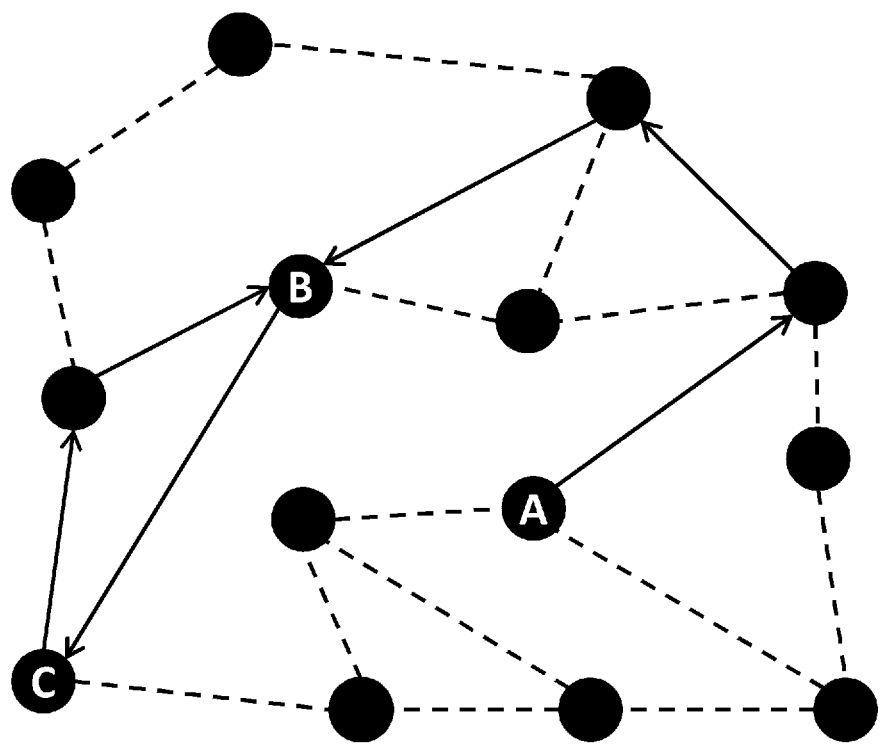
FIG. 8 is a view illustrating a road network according to a second embodiment.

In the first embodiment, a pick-up point and a drop-off point of a user are different from each other, but these points may be the same point. The movement of the autonomous vehicle 100 in this case is shown in the network diagram of FIG. 8.

Upon receiving service request information in which the user pick-up point and the user drop-off point are the same, the server device 200 determines an autonomous vehicle 100 that can provide the requested service and that can be dispatched to the user pick-up point by the service start time. Then, the server device 200 creates an operation command ordering the autonomous vehicle 100 to move from node A that is the current position of the vehicle to node B that is the user pick-up and drop-off point, travel to node C that is a predetermined distance away from the user pick-up and drop-off point by predetermined time, and then return to the user pick-up and drop-off point, and transmits this operation command to the autonomous vehicle 100.

The autonomous vehicle 100 (operation plan creation unit 1031) having received the operation command can perform the same process as in the first embodiment to set the running route from the current position of the vehicle to the user pick-up and drop-off point, the running route to the point a predetermined distance away from the user pick-up and drop-off point, and the running route from this point to the user pick-up and drop-off point.

According to this embodiment, it is possible to provide a service desired by a user without parking a vehicle that provides the service for a long time even when the user does not desire to travel to another location.

Third Embodiment

In the first and second embodiments, an operation command and an operation plan are created and a running route is set based on service request information acquired at the time of application for a service. An operation command and an operation plan that have been once created and a running route that has been once set may be changed.

When the autonomous vehicle 100 (operation plan creation unit 1031) calculates (updates) the expected arrival time as needed based on the position of the vehicle and the user drop-off point, and it turns out that the expected arrival time becomes later than the service end time if an initially set running route is taken, the operation plan creation unit 1031 may re-set a route that allows the autonomous vehicle 100 to reach the user drop-off point in a shorter time.

Even while the service is being provided, a user may be allowed to change, the service end time (or the service duration time), change the drop-off point, or apply for receiving an additional service, through a terminal installed in the autonomous vehicle 100 or a terminal carried by the user. When such an application is made, the server device 200 (operation command creation unit 2022) and/or the autonomous vehicle 100 (operation plan creation unit 1031) re-sets an operation command and an operation plan (running route) according to the application.

According to this embodiment, the running route can be automatically set according to changes in situation and to users' needs.

Fourth Embodiment

The autonomous vehicle 100 may have a plurality of internal spaces separated from one another by partitions so as to be able to provide a service to a plurality of users at the same time. In this embodiment, a vehicle that is already providing a service is also included among candidates for the autonomous vehicle 100 that is selected to provide a service by the operation command creation unit 2022 having received a service application from a user.

Specifically, the operation command creation unit 2022 transmits a new operation command to an autonomous vehicle 100 that has equipment (and a vacant space) for providing a service desired by a user, and that is being operated along such a route that the autonomous vehicle 100 can reach the user pick-up point by the service start time desired by the user and reach the user drop-off point by the service end time desired by the user. Upon receiving this operation command, the autonomous vehicle 100 (operation plan creation unit 1031) creates a new operation plan and re-sets a running route. According to this embodiment, the vehicles can be efficiently operated.

Others

The above embodiments merely illustrate the present disclosure, and the disclosure is not limited to the specific aspects described above. Various modifications can be made to the disclosure within the scope of the technical idea thereof. For example, in the sequence of the running route setting process, the setting of a route to avoid congestion (steps S302 to S304), the setting of a route that is less straining to run on (steps S307 to S309), and the setting of a route along which a vehicle stands by in a parking lot (steps S311 to S313) may be performed in a different order. Alternatively, the process may be performed with one or these route settings omitted.

The autonomous vehicle 100 of the embodiments may be provided with a sensor that detects the vehicle's picking up and dropping off a user, and detection of the vehicle's picking up or dropping off a user may constitute a condition for the autonomous vehicle 100 to move to the next destination. In this way, the autonomous vehicle 100 can be prevented from traveling to the next destination leaving behind a user or without dropping off a user. To prevent standing by indefinitely at the pick-up point of a user when the user does not show up at the point, the vehicle may move to the next destination even when picking up or dropping off of a user is not detected, on a condition that a predetermined time has elapsed.

When a user applies for a service, the user may register his or her contact address. The autonomous vehicle 100 may transmit, to the contact address of the user, a notification of arrival of the autonomous vehicle 100 and information far identifying the autonomous vehicle 100 that is to pick up the user, in keeping with the timing of arrival of the autonomous vehicle 100 at the user pick-up point. Thus, the user can be appropriately guided to the vehicle that is to pick up the user. Moreover, a nickname specified by the user, an application reception number, etc. may be shown on the video output unit 106 of the autonomous vehicle 100 to guide the user to the vehicle.

In the above embodiments, the autonomous vehicle 100 (operation plan creation unit 1031) having received an operation plan sets a running route. Alternatively, the server device 200 may set a running route, and the autonomous vehicle 100 having received this running route may run autonomously along the route. The server device 200 may be installed in the autonomous vehicle 100.

What is claimed is:

1. A vehicle operation management system comprising:
one or more vehicles including equipment configured to provide a predetermined service inside the vehicle and a running control unit configured to control autonomous running of the vehicle; and
a server device including a service request information acquisition unit configured to:
acquire service request information including start time specifying information for specifying time to start providing the service, end time specifying information for specifying time to end the service, information on a pick-up point at which the vehicle picks up a user scheduled to receive the service, and information on a drop-off point at which the vehicle drops off the user;
determine whether there is an autonomous vehicle that may provide the requested service and that may be dispatched to the pick-up point by the time to start providing the service;
upon determination that there is no autonomous vehicle that may provide the requested service and that may be dispatched to the pick-up point by the time to start providing the service, notify the user of the earliest time at which the service may be started and request that the user re-input the service request information;
upon determination that there is an autonomous vehicle that may provide the requested service and that may be dispatched to the pick-up point by the time to start providing the service, determine whether the pick-up point and the drop-off point are the same;
upon determination that the pick-up point and the drop-off point are the same, notify the user that the service request has been accepted;
upon determination that the pick-up point and the drop-off point are not the same, determine whether the drop-off point may be reached between the time to start providing the service and the time to end the service; and
upon determination that the pick-up point and the drop-off point may not be reached between the time to start providing the service and the time to end the service, notify the user of the time required to reach the drop-off point from the pick-up point, and request that the user re-input the service request information;
the server further includes an operation plan creation unit configured to:
search for a shortest route from a current position of the autonomous vehicle to the pick-up point;
calculate an expected arrival time at the pick-up point based on the shortest route;
determine whether a time difference between the expected arrival time and the time to start providing the service is greater than a predetermined threshold value;
upon determination that the time difference is not greater than the threshold value, set the shortest route as a running route for the autonomous vehicle;
upon determination that the time difference is greater than the threshold value, determine whether there is a less straining route from the current position of the autonomous vehicle to the pick-up point that has a smaller gradient or a smaller number of curves than the shortest route;
upon determination that there is a less straining route, calculate a second expected arrival time at the pick-up point based on the less straining route, and determine whether a time difference between the second expected arrival time and the time to start providing the service is greater than the threshold value;
upon determination that the time difference between the second expected arrival time and the time to start providing the service is not greater than the threshold value, set the less straining route as the running route;
upon determination that the time difference between the second expected arrival time and the time to start providing the service is greater than the threshold value, or upon determination that there is not a less straining route, determine whether a parking lot is available around the current location of the vehicle or between the current location of the vehicle and the pick-up location;
upon determination that a parking lot is available, set a route along which the autonomous vehicle stands by in the parking lot for a time that makes the time difference between the expected arrival time and the time to start providing the service smaller than the threshold value as the running route; and
upon determination that a parking lot is not available, set a route that makes the time difference between the expected arrival time and the time to start providing the service smaller than the threshold value as the running route;
wherein a running control unit controls running of the vehicle such that the vehicle runs along the running route;
wherein the service request information acquisition unit receives a change in the end time specifying information for specifying the time to end the service from the user, and the operation plan creation unit modifies the running route based on the change.

2. The vehicle operation management system according to claim 1, wherein:
the end time specifying information includes information on service contents; and
the operation plan creation unit obtains a time taken to provide the service based on the information on the service contents, and then calculates the end time from the time to start providing the service and the time taken to provide the service.

3. The vehicle operation management system according to claim 1, wherein:
at least one of the server device and the vehicle has a traffic information acquisition unit configured to acquire information on traffic around the vehicle; and
the operation plan creation unit sets the running route with priority given to a less congested route over a more congested route based on the information on traffic.

4. The vehicle operation management system according to claim 1, wherein:
at least one of the server device and the vehicle has a road information acquisition unit configured to acquire information on roads around the vehicle; and
the operation plan creation unit sets the running route with priority given to a route passing through a road that is less straining to run on over a route passing through a road that is more straining to run on based on the information on road.

5. The vehicle operation management system according to claim 1, wherein the operation plan creation unit sets the running route with priority given to a route on which the vehicle stands by for a predetermined time in a parking lot located around a current location or located on a route found by a search.

6. The vehicle operation management system according to claim 1, wherein the operation plan creation unit modifies the running route based on the position information on the vehicle and at least one of the time to start providing the service and the time to end the service.

7. The vehicle operation management system according to claim 1, wherein:
the service request information acquisition unit acquires pieces of service request information from a plurality of users; and
the operation plan creation unit combines the pieces of service request information from the users, and sets the running route with priority given to a route that allows one vehicle to provide services to a plurality of users at the same time.

8. The vehicle operation management system according to claim 1, wherein:
the service request information includes information on a contact address of a user; and
at least one of the server device and the vehicle has a user guidance unit configured to transmit information for guiding the user to the vehicle to the contact address of the user, in keeping with arrival of the vehicle at the pick-up point.

9. The vehicle operation management system according to claim 1, wherein:
the vehicle has a user pick-up and drop-off detection unit configured to detect the vehicle's picking up and dropping off the user; and
when the vehicle has arrived at the pick-up point, the running control unit allows the vehicle to start moving after the vehicle's picking up the user is detected.

10. A method of managing operation of one or more vehicles capable of autonomous running, the method comprising:
acquiring position information on the vehicle;
acquiring service request information including start time specifying information for specifying time to start providing a service, end time specifying information for specifying time to end the service, information on a pick-up point at which the vehicle picks up a user of the service, and information on a drop-off point at which the vehicle drops off the user, the start time specifying information, the end time specifying information, the information on the pick-up point, and the information on the drop-off point being pieces of information that are used to provide a predetermined service to the user by using the vehicle;
receiving an application for receiving the service based on the service request information;
determining whether there is an autonomous vehicle that may provide the requested service and that may be dispatched to the pick-up point by the time to start providing the service;
upon determination that there is no autonomous vehicle that may provide the requested service and that may be dispatched to the pick-up point by the time to start providing the service, notifying the user of the earliest time at which the service may be started and request that the user re-input the service request information;
upon determination that there is an autonomous vehicle that may provide the requested service and that may be dispatched to the pick-up point by the time to start providing the service, determining whether the pick-up point and the drop-off point are the same;
upon determination that the pick-up point and the drop-off point are the same, notifying the user that the service request has been accepted;
upon determination that the pick-up point and the drop-off point are not the same, determining whether the drop-off point may be reached between the time to start providing the service and the time to end the service;
upon determination that the pick-up point and the drop-off point may not be reached between the time to start providing the service and the time to end the service, notifying the user of the time required to reach the drop-off point from the pick-up point, and request that the user re-input the service request information;
searching for a shortest route from a current position of the autonomous vehicle to the pick-up point;
calculating an expected arrival time at the pick-up point based on the shortest route;
determining whether a time difference between the expected arrival time and the time to start providing the service is greater than a predetermined threshold value;
upon determination that the time difference is not greater than the threshold value, setting the shortest route as a running route for the autonomous vehicle;
upon determination that the time difference is greater than the threshold value, determining whether there is a less straining route from the current position of the autonomous vehicle to the pick-up point that has a smaller gradient or a smaller number of curves than the shortest route;
upon determination that there is a less straining route, calculating a second expected arrival time at the pick-up point based on the less straining route, and determining whether a time difference between the second expected arrival time and the time to start providing the service is greater than the threshold value;
upon determination that the time difference between the second expected arrival time and the time to start providing the service is not greater than the threshold value, setting the less straining route as the running route;
upon determination that the time difference between the second expected arrival time and the time to start providing the service is greater than the threshold value, or upon determination that there is not a less straining route, determining whether a parking lot is available around the current location of the vehicle or between the current location of the vehicle and the pick-up location;
upon determination that a parking lot is available, setting a route along which the autonomous vehicle stands by in the parking lot for a time that makes the time difference between the expected arrival time and the time to start providing the service smaller than the threshold value as the running route;
upon determination that a parking lot is not available, setting a route that makes the time difference between the expected arrival time and the time to start providing the service smaller than the threshold value as the running route;
causing the vehicle to run along the running route;

receiving a change in the end time specifying information for specifying the time to end the service from the user; and modifying the running route based on the change.

\* \* \* \* \*